April 6, 1937.　　　　S. DEBUS　　　　2,076,296

BREAD SLICING MACHINE

Filed Dec. 18, 1933　　　2 Sheets-Sheet 1

Inventor
S. Debus
By Emil F. Lange
Attorney

April 6, 1937.  S. DEBUS  2,076,296
BREAD SLICING MACHINE
Filed Dec. 18, 1933  2 Sheets-Sheet 2
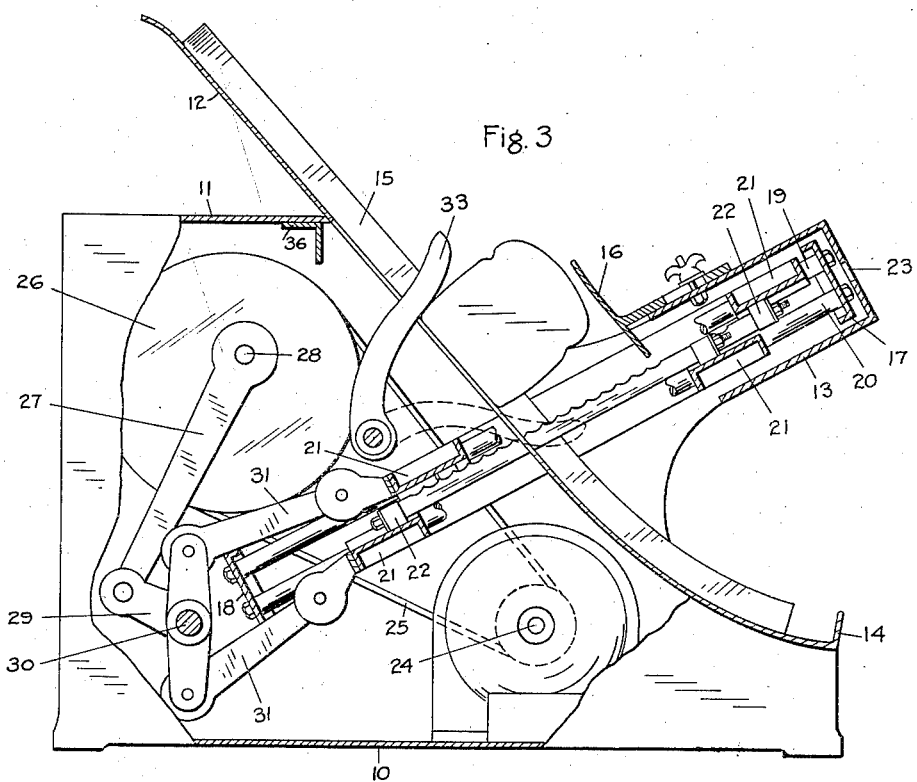
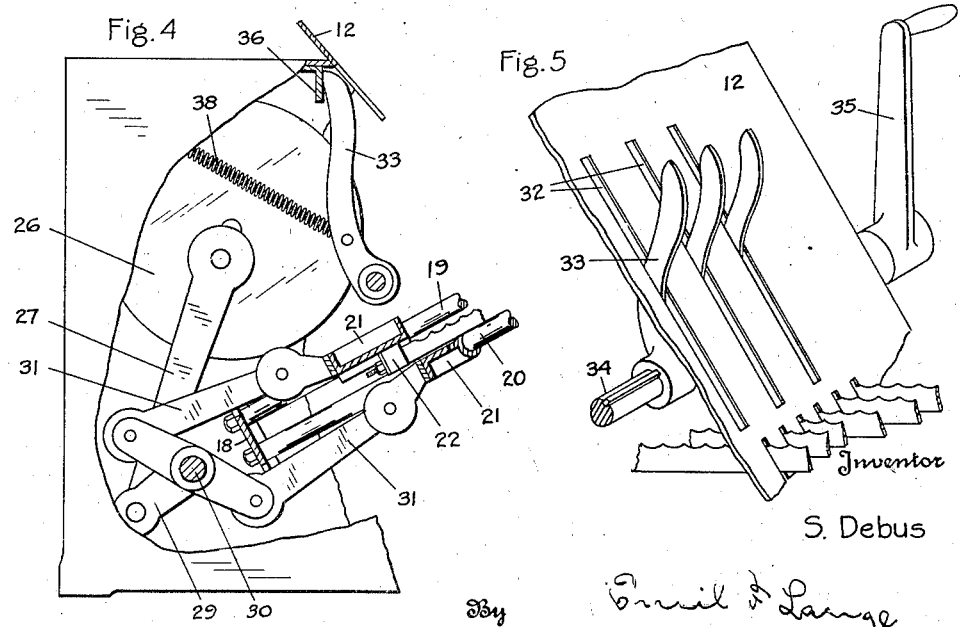
Inventor
S. Debus
By Emil F. Lange
Attorney Patented Apr. 6, 1937

2,076,296

UNITED STATES PATENT OFFICE 2,076,296

BREAD SLICING MACHINE

Sander Debus, Hastings, Nebr.

Application December 18, 1933, Serial No. 702,973

3 Claims. (Cl. 146—153)

My invention relates to bread slicing machines, its primary object being the provision of a dual purpose bread slicing machine which may be used in bakeries for slicing a large number of loaves of bread at a time but which is simple in construction and sufficiently low in cost to be available for retail dealers who keep only unsliced bread in stock and who slice the bread on the demand of the customer.

An important object of the invention is the provision of knives intersecting a gravity chute at an oblique angle for beginning the cut in the softer portions of the crust of the loaf.

Another object of the invention is the provision of a chute combined with manually operable pusher fingers for forcing single loaves of bread against the slicing knives.

Another of my objects is the provision of a simple and novel mechanism for reciprocating the slicing knives.

Having in view these objects and others which will be pointed out in the following description, I will now refer to the drawings, in which Figure 1 is a top plan view of the bread slicing machine with portions of the top being broken away to disclose interior parts.

Figure 3 is a side elevational view of the bread slicing machine as it is seen when portions of the side wall of the casings have been torn away.

Figure 4 is a view of a portion of the mechanism shown in Figure 3 but showing the opposite position of the mechanism for reciprocating the knives.

Figure 5 is a perspective view of a fragment of the gravity chute and the knives, the view also showing the operative position of the pusher fingers.

Figure 1:
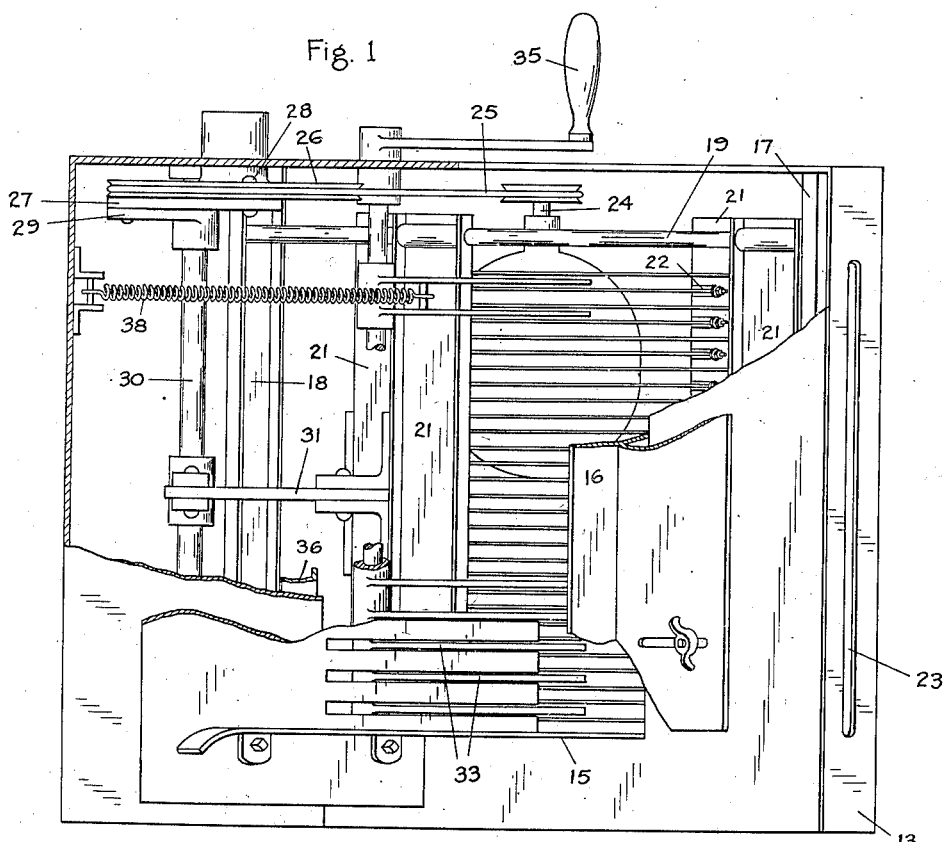
Figure 2:
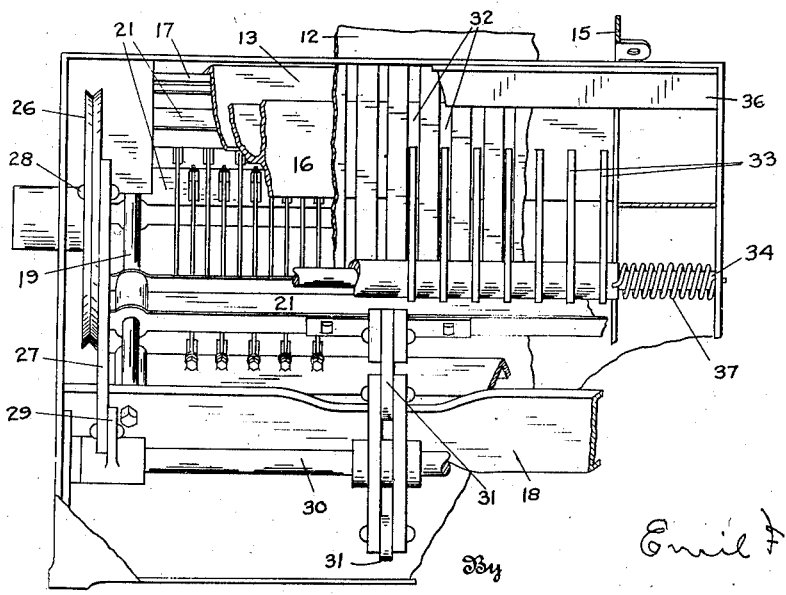
Figure 2 is a rear elevational view as seen when looking into the casing after a portion of the rear wall has been removed.

The bread slicing machine includes a chute with reciprocating knives intersecting the chute, the chute and the knives being shown inclined downwardly but in opposite directions. The angle formed by the intersection of the chute and the knives is slightly greater than a right angle.

The bread loaves coming from the pans have a soft crust in the portions within the pans and a relatively hard crust in the exposed portions of the loaves. The knives act like saws and if they are permitted to strike the loaves in the harder portions of the crust, they are very apt to mutilate the loaves. Besides, gravity alone is not always sufficient for causing the knives to penetrate the hard crusts. By causing the knives to enter the loaves first in the soft portions of the crust, the loaf can be sliced with little or no danger of crushing portions of the loaf. The inclination between the chute and the knives is such that the knives will engage the major portion of the softer crust almost instantly.

The frame of the bread slicing machine includes a bottom 10, side walls, a front wall and a removable rear wall. The front wall is relatively short in height and the rear wall is relatively long. The rear portion of the machine has a top wall 11 and the chute 12 functions as an inclined wall between the front edge of the top 11 and the top edge of the front wall. A cutter extension is also provided, as shown in Figure 3, this being in the form of a casing 13 for enclosing the knives. The bread which is fed into the machine is deposited on the chute 12 to be delivered against the projecting wall 14 within convenient reach of the operator. The chute is provided with a vertical guiding wall 15. At 16 is a guide which is slidably adjustable for loaves of various heighths.

Two rectangular knife frames are provided and arranged to reciprocate the knives in a common plane but in opposite directions. The channel members 17 and 18 are secured within the casing to the side walls thereof and transversely to the casing. At each end of these channel members upper and lower guide rods 19 and 20 are secured to function as guides for the cutter frames. Each cutter frame includes front and rear channel members 21 having a sliding relation with the guide rods 19 or 20. The upper and lower channel members lie in different planes and they are therefore provided with brackets 22 having knife attaching means which lie in a common plane. The knives of all the cutters may be properly tensioned by turning the nuts which are readily accessible through the aperture 23.

The knives are operated from the motor driven shaft 24. This drives the belt 25 and the pulley 26. The link 27 is secured eccentrically at 28 to the pulley 26. The link 27 drives the lever 29 to impart a rocking movement to the rock shaft 30 whereby the links 31 will be driven alternately in opposite directions. These links 31 are secured to the two knife frames to impart opposite reciprocatory movement to the knife frames and to the knives.

The loaf of bread when deposited on the chute 12 will slide by gravity until it comes in contact with the knives. At this point the knives engage the softer portions of the bread crust and quickly slice the loaf after which the sliced loaf will travel downwardly on the chute to be delivered against the wall 14. Gravity alone is, however, insufficient in some cases to overcome the friction of the loaf against the chute combined with the resistance of the knives. Where a number of loaves are to be sliced at one time this difficulty is never encountered because the weight of the loaves above will cause all of the loaves to slide downwardly. For manually controlling the movement of a loaf I provide the mechanism which is best shown in Figures 3, 4 and 5. The chute 12 is slotted at 32 for the passage therethrough of fingers 33. These fingers are secured to a shaft 34 having the crank handle 35 for manual operation. The casing is provided with an abutment 36 and the fingers 33 are yieldably held against this abutment by means of a torsion spring 37 or by means of a tension spring 38 or by any other suitable means. The inoperative position of the fingers 33 as shown in Figure 4 is such that no portion of the fingers is above the upper surface of the chute 12 to interfere with the sliding of the bread. When a single loaf is to be sliced and when it is not readily engaged by the knives, the operator merely pulls down on the lever 35 and then releases the lever after the knives enter the loaf. In slicing a number of loaves of bread the difficulty may not be encountered until the last loaf is reached in which case the same operation of the fingers will cause the knives to enter the loaf.

From the foregoing description it will be apparent that the bread slicing machine is capable of slicing a large number of loaves of bread in a very short time. The machine is also capable of slicing a single loaf. The machine is so simple in construction and its cost is so low that it is available for use by retail dealers who do not wish to carry in stock the sliced loaves of bread. Such dealers prefer to slice the loaves on the demand of the customers just as bulk or other coffee is frequently ground when demanded by the customer. The mechanism for driving the reciprocating knives is exceedingly simple and it is not liable to easily get out of order. All parts are readily accessible for oiling and adjustment when these are needed. The knives may be properly tensioned since the aperture 23 gives ready access to the nuts or other tensioning device. At the same time the knives are practically inaccessible to a clumsy operator who might be injured by getting his fingers into contact with them. The bread need only be deposited a loaf at a time on the upper part of the chute whence the loaves will slide downwardly under their own weight on the smooth chute. Even in the case of a single loaf the operator will find it easier and simpler to turn the crank handle 35 than to push the loaf down by hand and thus take the risk of having his fingers caught by the knives.

Having thus described my invention in such full, clear, and exact terms that its construction and operation will be readily understood by others skilled in the art to which it pertains, what I claim as new and desire to secure by Letters Patent of the United States is:

1. In combination, a gravity chute for receiving bread loaves with their bottom crusts in sliding contact therewith, manually operable means associated with said chute for supplementing the force of gravity to cause downward movement of the loaves on said chute, said means including a plurality of fingers pivotally movable through slots in said chute to bear against the rear surface of the bread loaf, and a plurality of parallel bread slicing knives intersecting said chute at an angle with the upper portion of said chute slightly greater than a right angle whereby said knives will engage the major portion of the softer side crust of the bread loaf before coming into engagement with the harder crust of the crown of the bread loaf.

2. In combination, a gravity chute for receiving bread loaves with their bottom crusts in sliding contact therewith, manually operable means associated with said chute for supplementing the force of gravity to cause downward movement of the loaves on said chute, said means including a plurality of fingers pivotally movable through slots in said chute to bear against the rear surfaces of the bread loaves, a spring for yieldably urging said fingers into their inoperative position, a stop member for limiting the movement of said fingers under the action of said spring, and a plurality of parallel bread slicing knives intersecting said chute at an angle with the upper portion of said chute slightly greater than a right angle whereby said knives will engage the major portion of the softer side crust of the bread loaf before coming into engagement with the harder crust of the crown of the bread loaf.

3. In a bread slicing machine, a gravity chute provided with an upper and a lower transverse series of slots, a plurality of reciprocable slicing knives passing through the slots of the lower series of slots at an angle with the upper portion of said chute slightly greater than a right angle, a manually operable rock shaft underneath said chute, fingers keyed to said shaft and adapted to pass through the slots of the upper series of slots to bear against the rear surface of a bread loaf to force it downwardly against said knives, a spring for causing the reverse turning of said shaft to position said fingers wholly underneath said chute, and a stop member for limiting the reverse movement of said fingers.

SANDER DEBUS.